US012574972B2

(12) United States Patent
    Islam et al.

(10) Patent No.: US 12,574,972 B2
(45) Date of Patent: Mar. 10, 2026

(54) RACH TIMELINE INCORPORATING BANDWIDTH PART SWITCH TO RECEIVE A SYNCHRONIZATION SIGNAL BLOCK

(71) Applicant: QUALCOMM Incorporated, San Diego, CA (US)

(72) Inventors: Muhammad Nazmul Islam, Littleton, MA (US); Jing Lei, San Diego, CA (US); Chun-Hao Hsu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 17/934,481

(22) Filed: Sep. 22, 2022

(65) Prior Publication Data

US 2023/0144052 A1    May 11, 2023

Related U.S. Application Data

(60) Provisional application No. 63/276,520, filed on Nov. 5, 2021.

(51) Int. Cl.
    *H04W 74/08*      (2024.01)
    *H04W 74/0833*    (2024.01)
    *H04W 74/0836*    (2024.01)
(52) U.S. Cl.
    CPC .... *H04W 74/0833* (2013.01); *H04W 74/0836* (2024.01)
(58) Field of Classification Search
    None
    See application file for complete search history.

(56) References Cited

U.S. PATENT DOCUMENTS

| | | | | |
|---|---|---|---|---|
| 2020/0344819 A1* | 10/2020 | Myung | .............. | H04W 74/0841 |
| 2020/0367196 A1* | 11/2020 | Chen | ...................... | H04L 5/0053 |
| 2022/0353914 A1* | 11/2022 | Zhang | ................... | H04W 76/19 |
| 2023/0115619 A1* | 4/2023 | Kumagai | .............. | H04L 5/0007 |
| | | | | 370/329 |
| 2023/0254794 A1* | 8/2023 | Park | ................... | H04B 7/18513 |
| | | | | 370/316 |
| 2023/0262677 A1* | 8/2023 | Zhou | ...................... | H04L 5/0098 |
| 2024/0008050 A1* | 1/2024 | Zhou | ................... | H04W 56/001 |
| 2024/0022897 A1* | 1/2024 | Wu | ......................... | H04W 8/24 |
| 2024/0155580 A1* | 5/2024 | Wang | ................... | H04L 5/0053 |
| 2024/0406944 A1* | 12/2024 | Mu | ................... | H04W 72/0457 |

* cited by examiner

*Primary Examiner* — Steve R Young
(74) *Attorney, Agent, or Firm* — Patterson & Sheridan LLP

(57)          ABSTRACT

Aspects of the present disclosure relate to wireless communications, and more particularly, to techniques for performing a random access channel (RACH) procedure. According to one aspect, a method for wireless communication by a user equipment (UE), generally includes detecting at least a first synchronization signal block (SSB) transmitted in a first bandwidth part (BWP), transmitting, in a second BWP associated with the first SSB, a number of first messages as part of a random access channel (RACH) procedure, monitoring, in the second BWP, for a second message sent in response to the number of first messages, and switching back to the first BWP to monitor for SSBs, if the second message is not received within a first timeline after transmitting the number of first messages and one or more conditions are met.

28 Claims, 19 Drawing Sheets

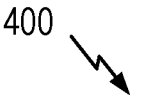
400
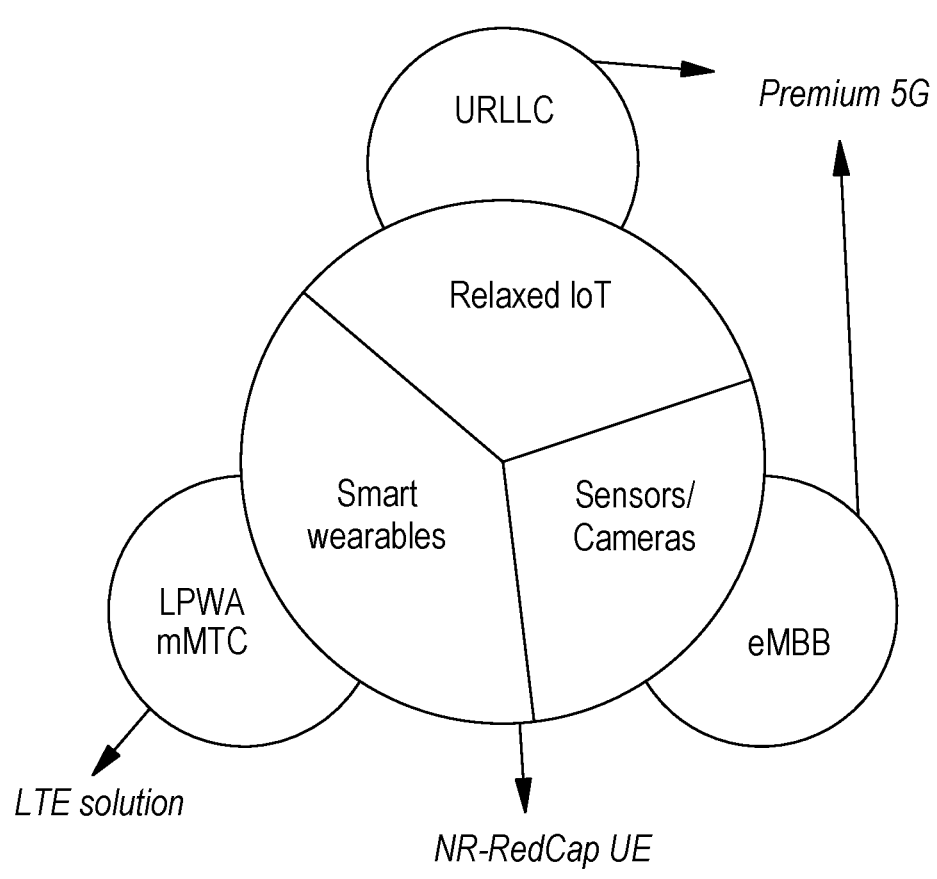
FIG. 4

700

| Non-RedCap initial DL BWP | RedCap initial DL BWP | RedCap non-initial DL BWP |
|---|---|---|
| Contains SSB, RACH CSS & CORESET0 | Contains RACH CSS Does not contain SSB | May/may not contain SSB and system info |

800

| | NR Slot length | BWP switch delay $T_{BWPswitchDelay}$ (slots) | |
|---|---|---|---|
| | (ms) | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |

1200

RedCap UE

NW

SSB

Detect SSB in Non-RedCap initial BWP

MSG1 Initial/Re-Transmission(s)

Switch to RedCap Initial BWP for RACH

MSG2 (fails)

Switch Back to Non-RedCap initial BWP to monitor for SSB

SSB

MSG1

Switch back to RedCap Initial BWP to resume RACH

MSG2

MSG3

MSG4

Extended Timeline

1600

A METHOD FOR WIRELESS COMMUNICATION BY A
NETWORK ENTITY

1610

DETERMINE ONE OR MORE PARAMETERS TO ALLOW A USER
EQUIPMENT (UE) TO SWITCH, DURING A RANDOM ACCESS CHANNEL
(RACH) PROCEDURE, FROM A SECOND BWP TO A FIRST BWP TO
MONITOR FOR SYNCHRONIZATION SIGNAL BLOCKS (SSBS)

1620

TRANSMIT SIGNALING, TO THE UE, CONFIGURING THE UE WITH THE
ONE OR MORE PARAMETERS

1700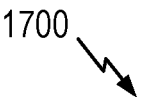

A METHOD FOR WIRELESS COMMUNICATION BY A USER EQUIPMENT (UE)

1710

DETECT AT LEAST A FIRST SYNCHRONIZATION SIGNAL BLOCK (SSB) TRANSMITTED IN A FIRST BANDWIDTH PART (BWP)

1720

TRANSMIT, IN A SECOND BWP, A NUMBER OF FIRST MESSAGES AS PART OF A RANDOM ACCESS CHANNEL (RACH) PROCEDURE

1730

MONITOR, IN THE SECOND BWP, FOR A SECOND MESSAGE SENT IN RESPONSE TO THE NUMBER OF FIRST MESSAGES

1740

SWITCH BACK TO THE FIRST BWP TO MONITOR FOR SSBS, IF THE SECOND MESSAGE IS NOT RECEIVED WITHIN A FIRST TIMELINE AFTER TRANSMITTING THE NUMBER OF FIRST MESSAGES AND ONE OR MORE CONDITIONS ARE MET

1810

1808

Transceiver

1802

Processing System

1806

1820

1830

Processor(s)

Computer-Readable
Medium/Memory

1821

Circuitry for switching back to the
first BWP to monitor for SSBs, if
the second message is not
received within a first timeline
after transmitting the number of
first messages and one or more
conditions are met

1831

Code for switching back to the
first BWP to monitor for SSBs, if
the second message is not
received within a first timeline
after transmitting the number of
first messages and one or more
conditions are met

1822

Circuitry for transmitting
signaling, to the UE, configuring
the UE with the one or more
parameters

1832

Code for transmitting signaling,
to the UE, configuring the UE
with the one or more parameters

*FIG. 18*

RACH TIMELINE INCORPORATING BANDWIDTH PART SWITCH TO RECEIVE A SYNCHRONIZATION SIGNAL BLOCK

CROSS-REFERENCE TO RELATED APPLICATIONS

This application claims benefit of and priority to U.S. Application No. 63/276,520, filed Nov. 5, 2021, which is assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for performing a random access channel (RACH) procedure.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment (UE). The method may include detecting at least a first SSB transmitted in a first BWP. The method may include transmitting, in a second BWP, a number of first messages as part of a RACH procedure. The method may include monitoring, in the second BWP, for a second message sent in response to the number of first messages. The method may include switching back to the first BWP to monitor for SSBs, if the second message is not received within a first timeline after transmitting the number of first messages and one or more conditions are met.

One aspect provides method for wireless communication by a network entity. The method may include determining one or more parameters to allow a user equipment (UE) to switch, during a random access channel (RACH) procedure, from a second bandwidth part (BWP) to a first BWP to monitor for synchronization signal blocks (SSBs). The method may include transmitting signaling, to the UE, configuring the UE with the one or more parameters.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 4 depicts an example new radio (NR) reduced capability (RedCap) user equipment (UE).

FIG. 17 illustrates example operations for wireless communications by a UE, in accordance with some aspects of the present disclosure.

FIG. 18 depicts aspects of an example communications device.

DETAILED DESCRIPTION

Aspects of the present disclosure provide apparatuses, methods, processing systems, and computer-readable mediums for a RACH procedure with an extended timeline. For example, the extended timeline may allow for switching from a reduced capability (RedCap) bandwidth part (BWP) back to a non-RedCap BWP to receive synchronization signal blocks (SSBs) during a random access channel (RACH) procedure.

In some wireless communication standards, 5G new radio (NR) may be scalable and deployable in a more efficient and cost-effective way. To better meet the requirements of a scalable NR network, a new UE type with reduced capabilities (RedCap) has been introduced. A RedCap UE may exhibit a relaxation of peak throughput (e.g., 20 MHz), as well as lower latency and/or reliability requirements.

5G new radio (NR) user equipments (UEs) may access synchronization signal blocks (SSBs), control resource set zero (CORESET0), and random access channel (RACH) common search space (CSS) in its initial downlink (DL) bandwidth part (BWP). RedCap UEs may not have SSBs and CORESET0 in its initial bandwidth part due to its low bandwidth capability. As a result, a RedCap UE may not be able to measure and track SSBs during a RACH procedure. Thus, it may be restricted to sending a RACH preamble (MSG1) on resources associated with the same SSB, even when the UE fails to receive a random access response (RAR/MSG2).

According to certain aspects of the present disclosure, however, a RACH procedure with an extended timeline may allow a RedCap UE to switch from an initial RedCap BWP (with no SSBs) during the RACH procedure in order to receive a new SSB. After detecting an SSB, the UE may switch back to the initial RedCAP BWP to resume the RACH procedure. Thus, the extended timeline may allow the UE to detect a different SSB, which may increase the likelihood of successful completion of the RACH procedure.

Introduction to Wireless Communication Networks

Figure 1:
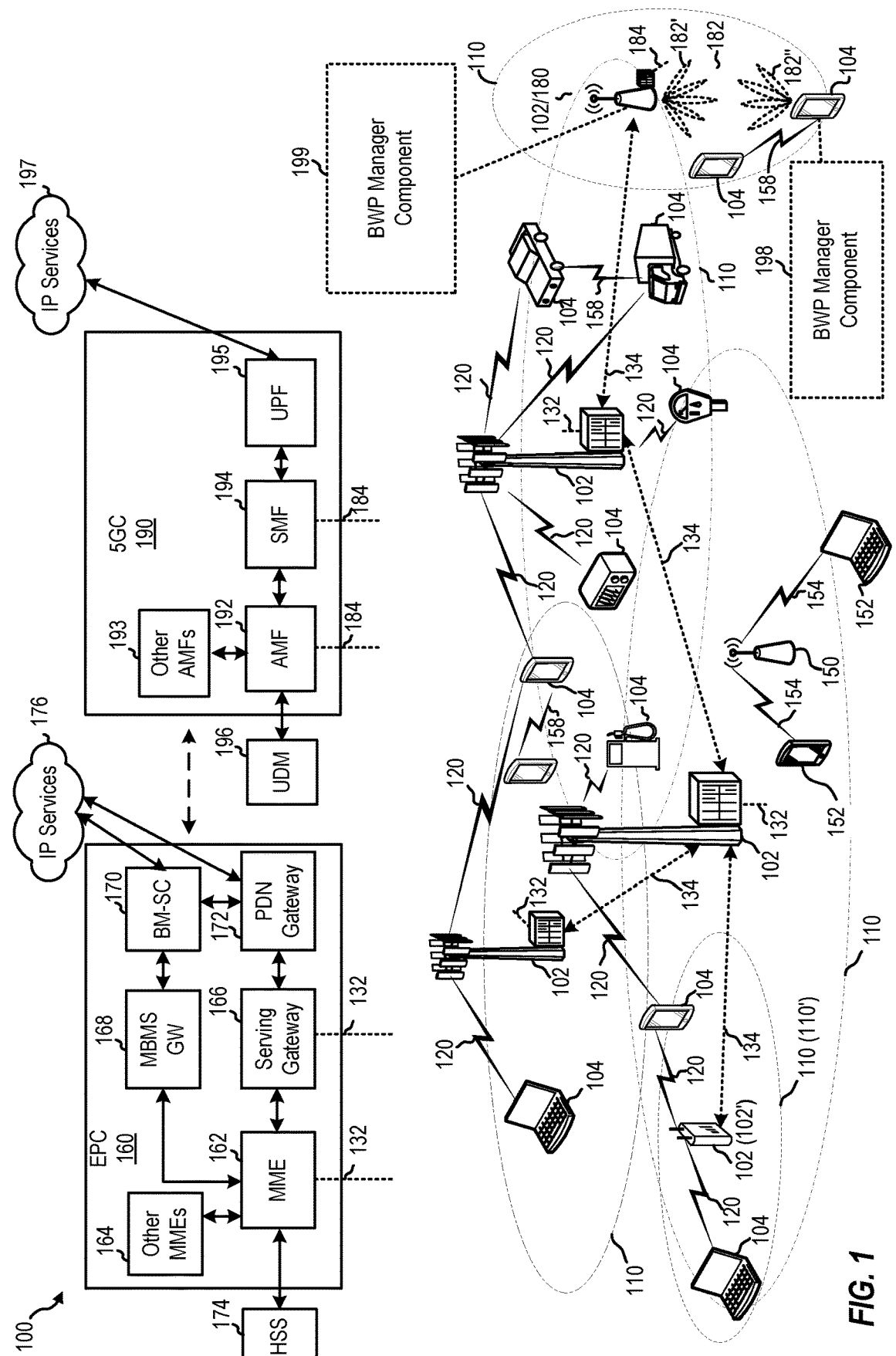
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes BWP manager component 199, which may be configured to support wireless communication on multiple BWPs. Wireless network 100 further includes BWP manager component 198, which may be used configured to switch BWPs based on detected sychronization signal blocks (SSBs).

Figure 2:
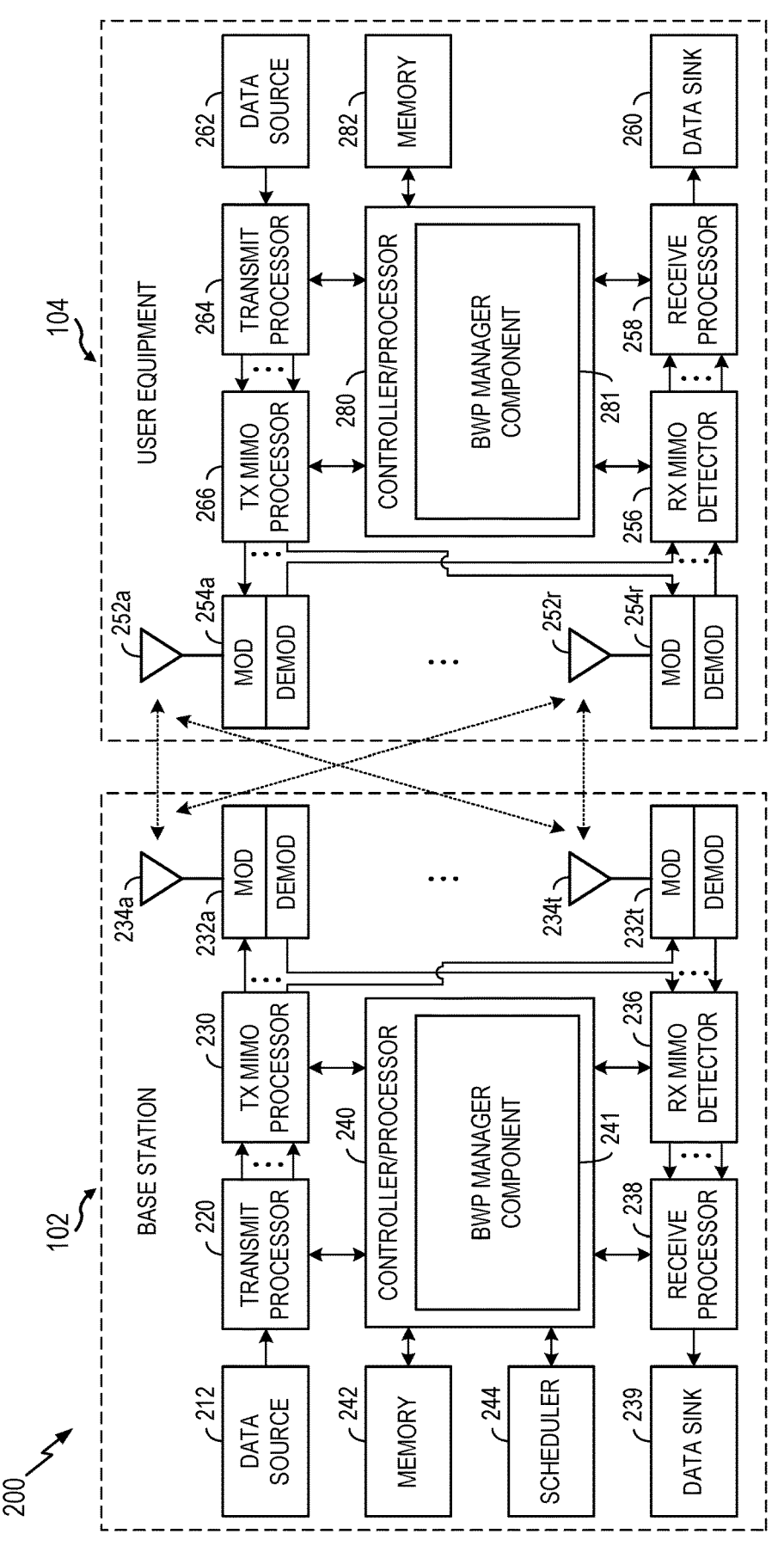
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes BWP manager component 241, which may be representative of BWP manager component 199 of FIG. 1. Notably, while depicted as an aspect of controller/processor 240, BWP manager component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes BWP manager component 281, which may be representative of BWP manager component 198 of FIG. 1. Notably, while depicted as an aspect of controller/processor 280, BWP manager component 281 may be implemented additionally or alternatively in various other aspects of user equipment 104 in other implementations.

In various aspects, a network entity or network node can be implemented as an aggregated base station, as a disaggregated base station, a component of a base station, an integrated access and backhaul (IAB) node, a relay node, a sidelink node, to name a few examples.

The disaggregated base station architecture may include one or more central units (CUs) that can communicate directly with a core network via a backhaul link, or indirectly with the core network through one or more disaggregated base station units (such as a Near-Real Time (Near-RT) RAN Intelligent Controller (RIC) via an E2 link, or a Non-Real Time (Non-RT) RIC associated with a Service Management and Orchestration (SMO) Framework, or both). A CU may communicate with one or more distributed units (DUs) via respective midhaul links, such as an F1 interface. The DUs may communicate with one or more radio units (RUs) via respective fronthaul links. The RUs may communicate with respective UEs 104 via one or more radio frequency (RF) access links. In some implementations, the UE 104 may be simultaneously served by multiple RUs.

Each of the units, e.g., the CUs, the DUs, the RUs, as well as the Near-RT RICs, the Non-RT RICs and the SMO Framework, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU. The CU may be configured to handle user plane functionality (e.g., Central Unit-User Plane (CU-UP)), control plane functionality (e.g., Central Unit-Control Plane (CU-CP)), or a combination thereof. In some implementations, the CU can be logically split into one or more CU-UP units and one or more CU-CP units. The CU-UP unit can communicate bidirectionally with the CU-CP unit via an interface, such as the E1 interface when implemented in an O-RAN configuration. The CU can be implemented to communicate with the DU, as necessary, for network control and signaling.

The DU may correspond to a logical unit that includes one or more base station functions to control the operation of one or more RUs. In some aspects, the DU may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU may further host one or more low PHY layers. Each layer (or module) can be implemented with an interface configured to communicate signals with other layers (and modules) hosted by the DU, or with the control functions hosted by the CU.

Lower-layer functionality can be implemented by one or more RUs. In some deployments, an RU, controlled by a DU, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) can be implemented to handle over the air (OTA) communications with one or more UEs 104. In some implementations, real-time and non-real-time aspects of control and user plane communications with the RU(s) can be controlled by the corresponding DU. In some scenarios, this configuration can enable the DU(s) and the CU to be implemented in a cloud-based RAN architecture, such as a vRAN architecture.

The SMO Framework may be configured to support RAN deployment and provisioning of non-virtualized and virtualized network elements. For non-virtualized network elements, the SMO Framework may be configured to support the deployment of dedicated physical resources for RAN coverage requirements which may be managed via an operations and maintenance interface (such as an O1 interface). For virtualized network elements, the SMO Framework may be configured to interact with a cloud computing platform (such as an open cloud (O-Cloud)) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework can communicate with a hardware aspect of a 4G RAN, such as an open eNB (O-eNB), via an O1 interface. Additionally, in some implementations, the SMO Framework can communicate directly with one or more RUs via an O1 interface. The SMO Framework also may include a Non-RT RIC configured to support functionality of the SMO Framework.

The Non-RT RIC may be configured to include a logical function that enables non-real-time control and optimization of RAN elements and resources, Artificial Intelligence/ Machine Learning (AI/ML) workflows including model training and updates, or policy-based guidance of applica- tions/features in the Near-RT RIC. The Non-RT RIC may be coupled to or communicate with (such as via an A1 inter- face) the Near-RT RIC. The Near-RT RIC may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC.

In some implementations, to generate AI/ML models to be deployed in the Near-RT RIC, the Non-RT RIC may receive parameters or external enrichment information from exter- nal servers. Such information may be utilized by the Near- RT RIC and may be received at the SMO Framework or the Non-RT RIC from non-network data sources or from net- work functions. In some examples, the Non-RT RIC or the Near-RT RIC may be configured to tune RAN behavior or performance. For example, the Non-RT RIC may monitor long-term trends and patterns for performance and employ AI/ML models to perform corrective actions through the SMO Framework (such as reconfiguration via O1) or via creation of RAN management policies (such as A1 policies).

Figures 3A, 3B, 3C, 3D:
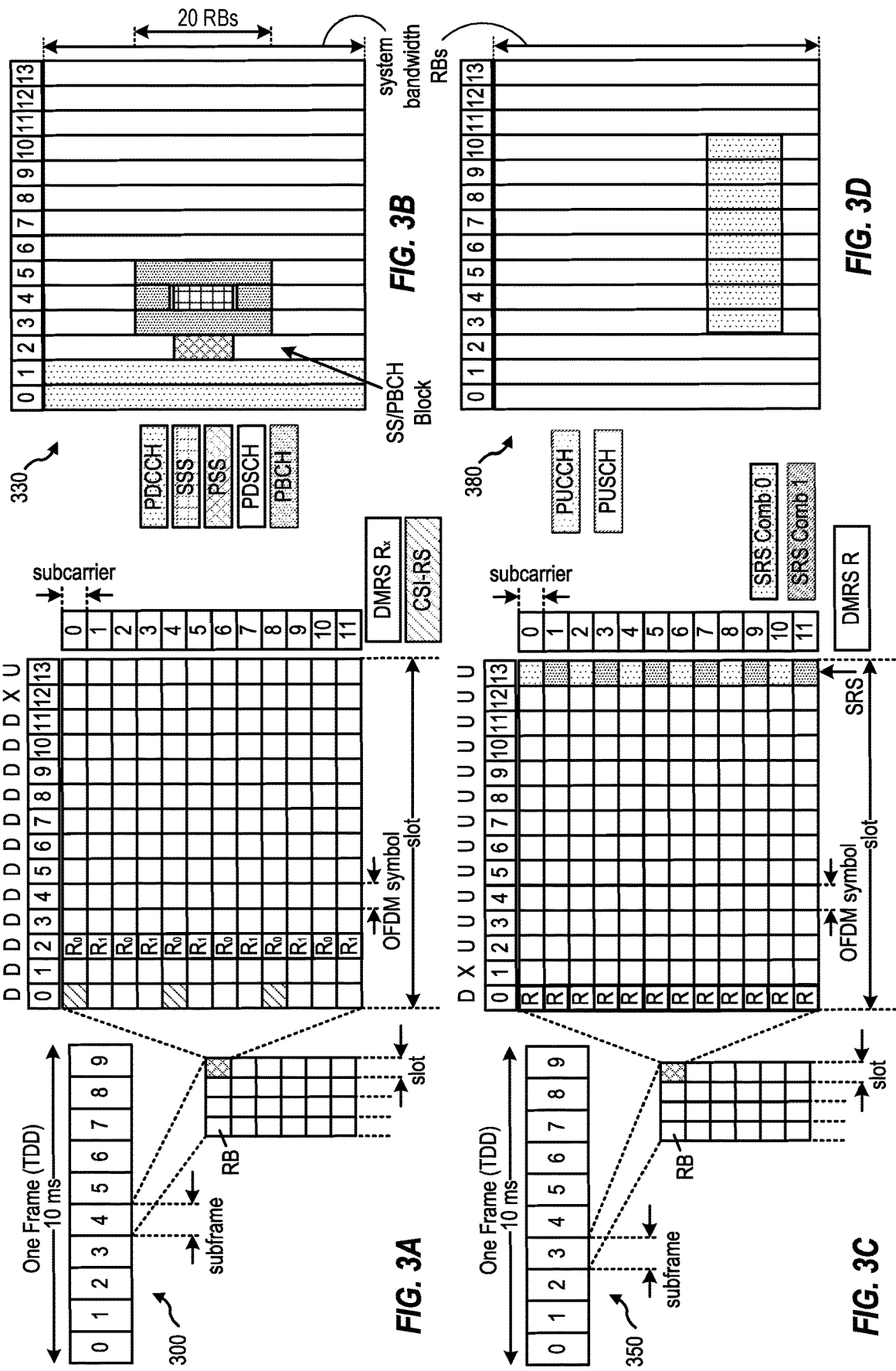
FIGS. 3A-3D depict various example aspects of data structures for a wireless communication network.

FIGS. 3A-3D depict aspects of data structures for a wireless communication network, such as wireless commu- nication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Reduced Capability (RedCap) UE

Various technologies may be the focus of current wireless communication standards. For example, Rel-15 and/or Rel- 16 may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., Rel-17 and beyond) there may exist a strong desire for new radio (NR) to be scalable and deployable in a more efficient and cost-effective way. Thus, a new UE type with reduced capabilities (Red- Cap) has been introduced. RedCap UE may exhibit a relax- ation of peak throughput (e.g., 20 MHz), as well as lower latency and/or reliability requirements. Also, the RedCap UE may involve lower device cost (and complexity) and improved efficiency (e.g. power consumption, system over- head, and cost improvements) as compared to high-end

Figure 8:
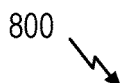
FIG. 8 depicts example delays for BWP switching.

8 devices, such as high-end eMBB and URLCC devices of 5G NR Rel-15/16 (e.g., high-end smartphones). In some cases, a cell may allow access for a RedCap UE. A network can configure a separate initial UL BWP for RedCap UEs in a system information block (SIB) which may be used both during and after initial access. A RedCap UE may not be configured to support a BWP wider than the maximum bandwidth of the initial BWP for the RedCap UE; however, a non-RedCap UE, which may share an initial UL BWP with the RedCap UE, is allowed to exceed the maximum band- width of the initial BWP. The RedCap UE may switch to a non-initial BWP by using the BWP switching mechanisms described in FIG. 8 below.

For many use cases, a RedCap UE may be implemented with a device design having a more compact form factor. RedCap UEs may also support frequency range (FR) 1 and/or 2 bands for frequency division duplexed (FDD) and/or time division duplexed (TDD) communications. For F1, a basic BWP operation with restriction may be used as a starting point for RedCap UE capability. Alternatively, basic BWP operation without restriction may be used as a starting point for RedCap UE capability. For FR1 in TDD, center frequencies may be the same for the initial DL and UL BWPs used during random access for RedCap UEs. Center frequencies may be the same for a non-initial DL and UL BWPs with the same BWP identifier for a RedCap UE.

Thus, some design objectives of the NR RedCap UE may include scalable resource allocation, coverage enhancement for DL and/or UL, power saving in all RRC states, and/or co-existence with the NR premium UE. As shown in FIG. 4, an NR-RedCap UE may be a smart wearable device, a sensor/camera, or any other device configured for relaxed internet-of-things (IoT) communications. Further, a RedCap UE functionality and/or capability may overlap with those of long term evolution (LTE) and/or fifth generation (5G) devices (e.g., premium 5G devices). For example, the func- tionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 5B:
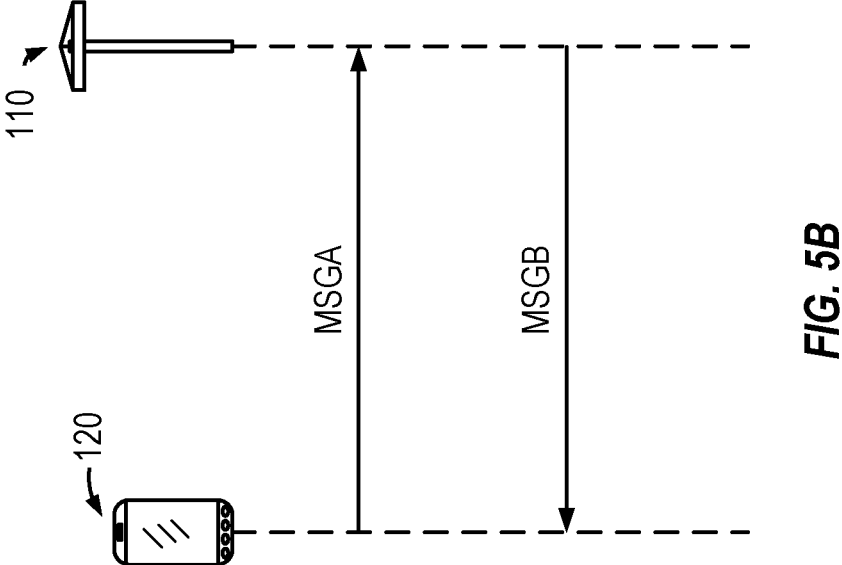
FIG. 5A and FIG. 5B depict call flows for 2-step and 4-step random access channel (RACH) procedures, respectively.
Figure 5A:
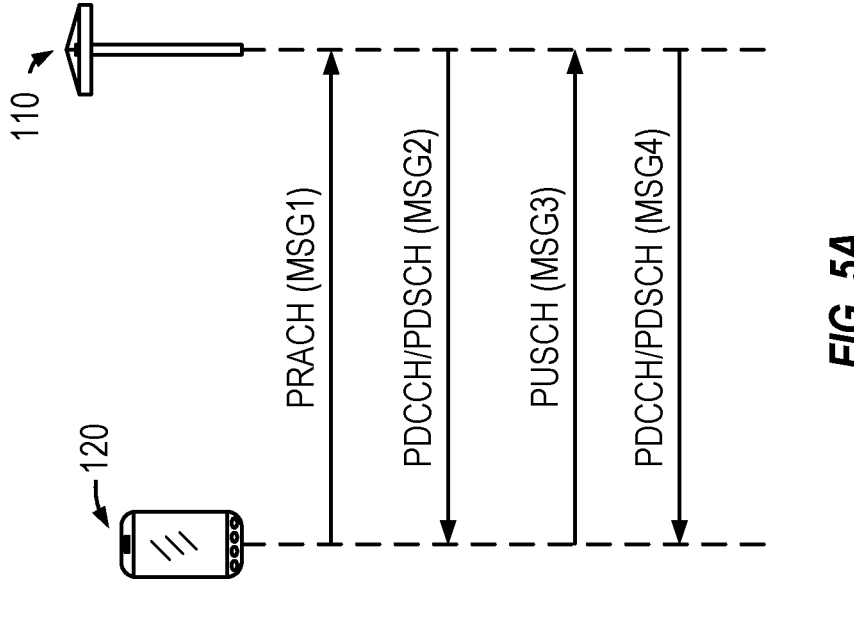

FIG. 5A is a timing (or "call-flow") diagram illustrating an example four-step RACH procedure, in accordance with certain aspects of the present disclosure. A first message (MSG1) may be sent from the UE 104 to BS 102 on the physical random access channel (PRACH). In this case, MSG1 may only include a RACH preamble. BS 102 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 104 to BS 102 on the PUSCH. MSG3 may include one or more of a RRC connection request, a tracking area update request, a system information request, a positioning fix or positioning signal request, or a scheduling request. The BS 110 then responds with MSG 4 which may include a contention resolution message.

In some cases, to speed access, a two-step RACH procedure may be supported. As the name implies, the two-step RACH procedure may effectively "collapse" the four messages of the four-step RACH procedure into two messages.

FIG. 5B is a timing diagram illustrating an example two-step RACH procedure, in accordance with certain aspects of the present disclosure. A first enhanced message (msgA) may be sent from the UE 104 to BS 102. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). BS 102 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion generally includes a msgA preamble occasion (for transmitting a preamble signal) and a msgA payload occasion for transmitting a PUSCH. The msgA preamble transmission generally involves:

(1) selection of a preamble sequence; and
(2) selection of a preamble occasion in time/frequency domain (for transmitting the selected preamble sequence).

The msgA payload transmission generally involves:

(1) construction of the random access message payload (DMRS/PUSCH); and
(2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. Upon detecting an SSB, the UE may select an RO and one or more PRUs associated with that SSB for a MSG1/msgA transmission. In some cases, a RO associated with the detected SSB falls within a RedCap UE bandwidth, and the RedCap UE may utilize a separate initial UL BWP for RedCap (which is not expected to exceed the maximum RedCap UE bandwidth) which may include ROs for RedCap UEs. ROs may be dedicated for RedCap UEs or shared with non-RedCap UEs. The finite set of ROs and PRUs may help reduce monitoring overhead (blind decodes) by a base station.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that uses two-step RACH procedures can typically support contention-based random access (CBRA) transmission of messages (e.g., msgA) within a finite range of payload sizes and with a finite number of MCS levels.

Figure 6:
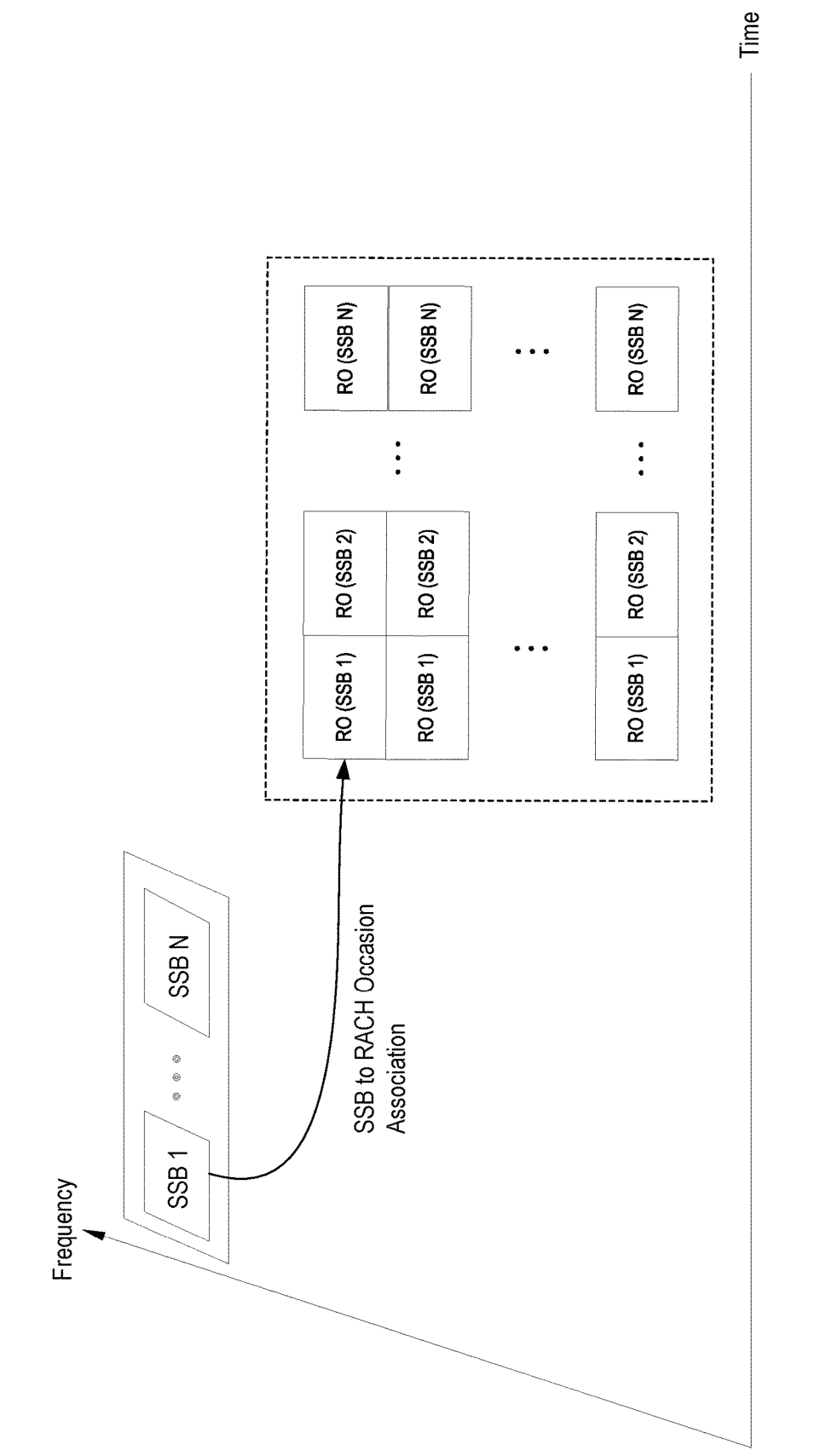
FIG. 6 illustrates an example association of SSBs to RACH occasions (ROs).

After a UE has selected an SSB (beam), for that SS block there is a predefined one or more ROs with certain time and frequency offset and direction (e.g., specific to the selected SSB). FIG. 6 illustrates an example association (mapping) between SSBs and ROs.

This SSB to RO association is used for the gNB to know what beam the UE has acquired/is using (generally referred to as beam establishment). One SSB may be associated with one or more ROs or more than one SSB may be associated with one RO. Association is typically performed in the frequency domain first, then in the time domain within a RACH slot, then in the time domain across RACH slots (e.g., beginning with lower SSB indexes). An association period is typically defined as a minimum number of RACH configuration periods, such that all (configured) SSB beams are mapped into ROs.

Aspects Related to Switching from a RedCap BWP to Receive SSBs

Figure 7:
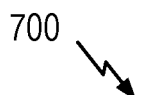
FIG. 7 illustrates example features for RedCap and non-RedCap bandwidth parts (BWPs).

Due to differences in capability, RedCap UEs (due to their low bandwidth capability) and conventional (e.g., non-RedCap or Legacy) UEs may be configured to operate in bandwidth parts (BWPs) with different features. The table 700 in FIG. 7 summarizes some of the different features. For example, a conventional, non-RedCap initial downlink (DL) BWP may contain SSBs, RACH common search space (CSS) and CORESET0. As illustrated in FIG. 7, a RedCap initial DL BWP may contain, for example, the RACH CSS, but may not contain SSBs, CORESETs (e.g., CORESET0, CORESET for paging), and/or system information blocks (SIB). In other cases, a RedCap UE may not contain the RACH CSS, but may contain CORESETs (e.g., CORESET0). Similarly, the RedCap non-initial DL BWP may not contain SSB or system information, and may be unable to access this information. Though operating without certain information may significantly reduce the complexity of a RedCap UE, a RedCap UE operating in these BWPs without access to information (e.g., SSBs) may not get the benefit of the information while operating on the BWP.

As a result, a RedCap UE operating in these BWPs may not get the benefit of SSBs. Aspects of the present disclosure, however, may allow a RedCap UE to implement extended timelines, allowing the RedCap UE to switch to a different BWP (e.g., to a non-RedCap initial DL BWP) during a RACH procedure to monitor for SSBs. After detecting an SSB, the RedCap UE may then return (e.g., to the RedCap initial BWP) to resume the RACH procedure.

Thus, the techniques presented herein may help address a potential issue that is caused by the RedCap UE not being able to measure and track SSBs during a RACH procedure. The potential issue may be caused because the UE would have to re-select RACH resources using the same SSB during RACH retransmission (despite the previous failure), if the UE fails to receive an RAR after sending a RACH preamble and the UE is not allowed to monitor SSBs. In certain cases, failure to track and measure SSBs in a RedCap BWP may result in CORESET sets and CSS sets (e.g., for paging, small data transmission, random access, etc.) failing to be configured at a UE.

In some cases, the UE may be able to increase a power ramping counter during RACH retransmissions, but cannot change SSBs. This may lead to UE congestion during a RACH retransmission when, for example, other UEs may be reusing the same SSB for RACH transmissions.

In general, a conventional RedCap UE is not be able to track SSBs from the time of an initial Msg1 transmission until the time the network configures the RedCap UE with an active BWP (that contains non-cell-defining SSB) via RRC signaling. As a result, a UE may not be able to receive and transmit messages properly during the RACH procedure.

Typically, when a UE switches from a first to a second BWP, a timeline is followed that accounts for BWP switching delays. Table 800 in FIG. 8 lists example BWP switching delays (in units of slots). As illustrated, switching delays depend on various factors, such as slot length and the type of BWP switch. For example, a first type (Type 1) may depend on UE capability. For a second type, if the BWP switch involves changing of SCS, the BWP switch delay may be determined by the smaller subcarrier spacing (SCS) between the SCS before the BWP switch and the SCS after BWP switch.

Figure 9:
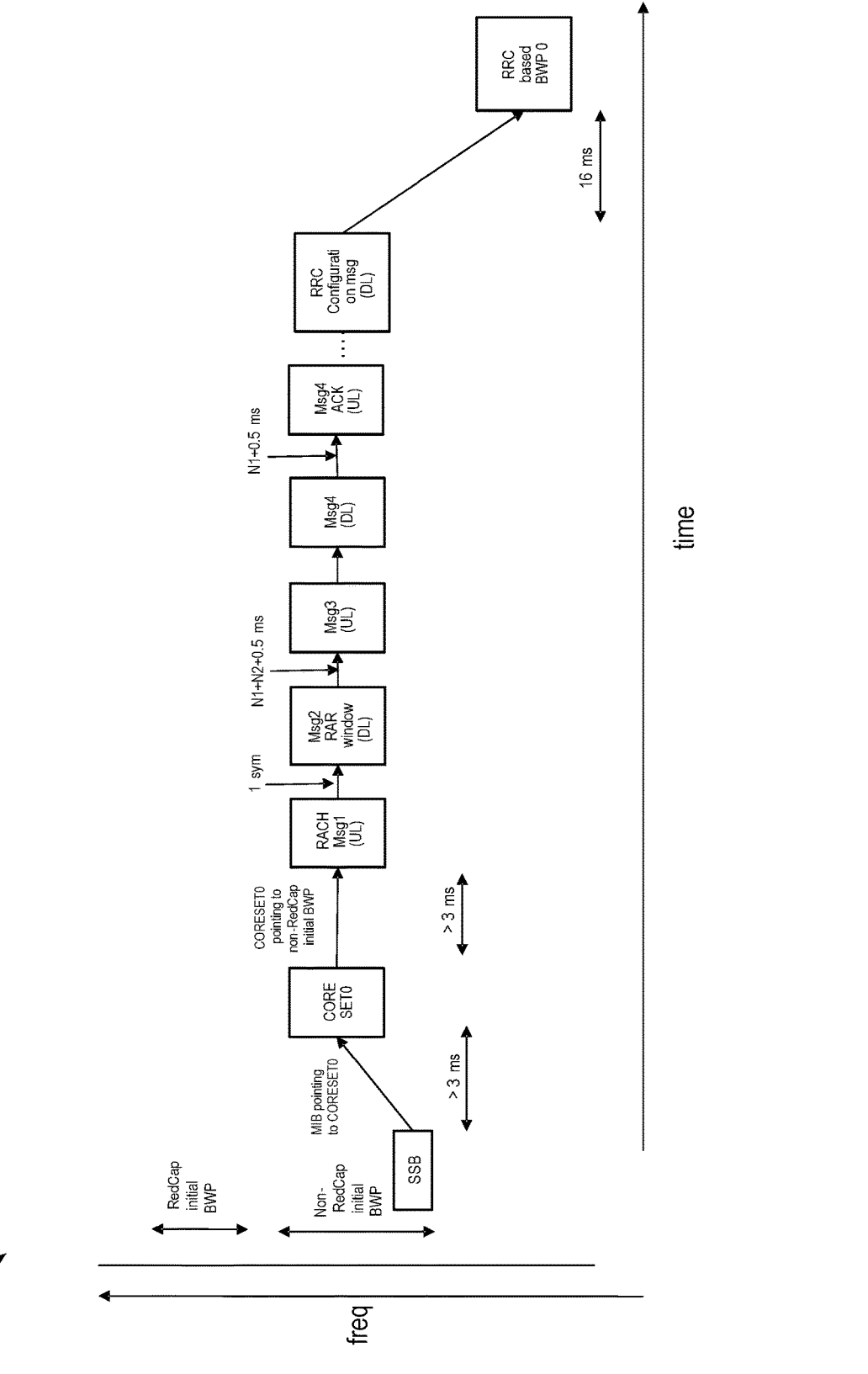
FIG. 9 depicts an example timeline for a RACH procedure.
Figure 10:
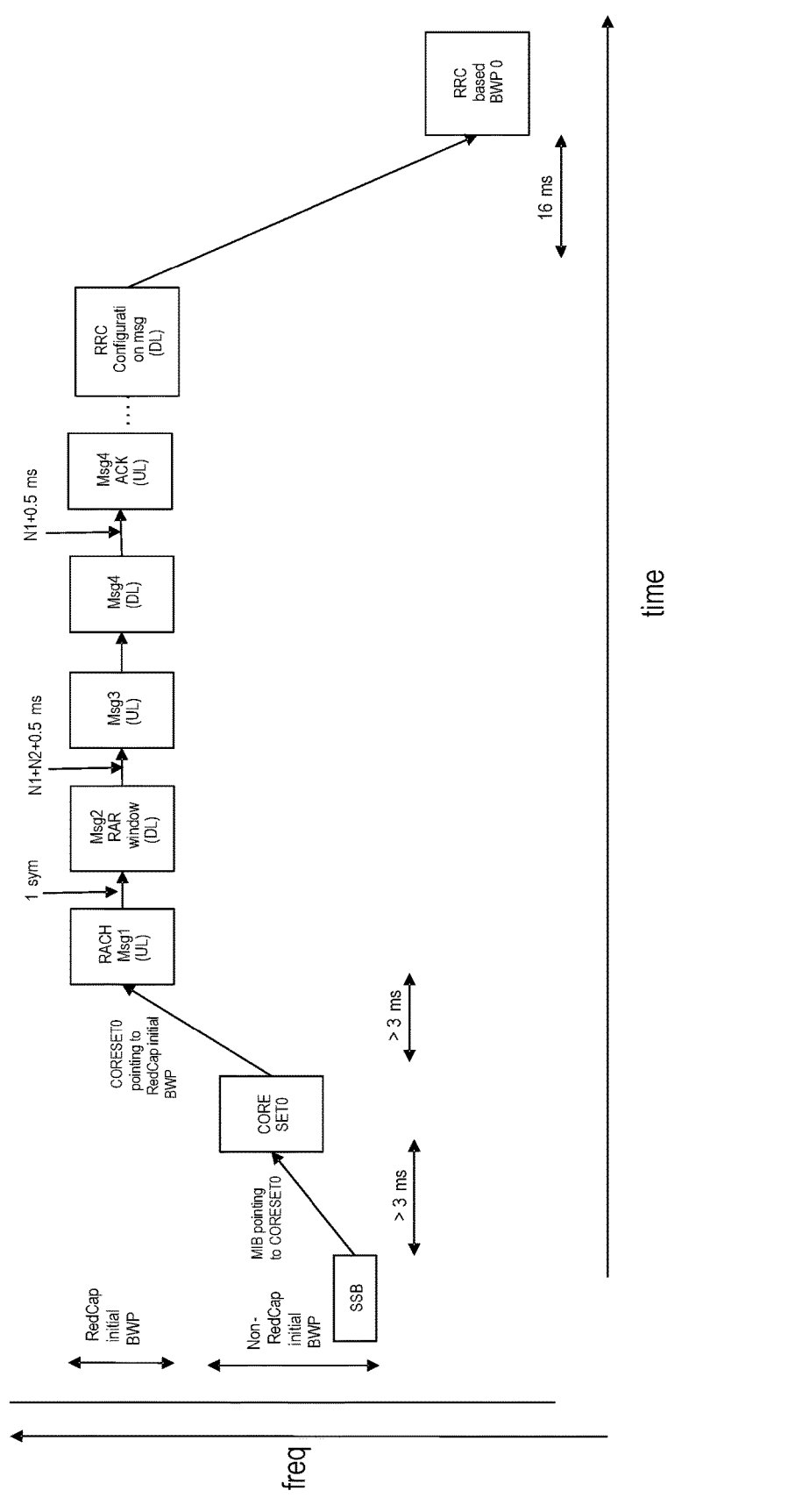
FIG. 10 depicts an example timeline for a RACH for a RedCap UE.

Difference between RedCap and non-RedCap UEs may be understood with reference to the example timelines shown in FIGS. 9 and 10.

FIG. 9 illustrates an example timeline 900 for a conventional (e.g., legacy non-RedCap) UE. As illustrated, this RACH procedure may take place in the Non-RedCap initial BWP in which SSSs are transmitted. After detecting an SSB, the UE may determine an associated CORESET0 (based on a MIB/PBCH in the SSB) and a RACH resource for sending a RACH preamble (MSG1). In this case, the Legacy (Non-RedCap UE) can track SSBs during RACH procedure because SSBs and RACH DL messages fall within the initial DL BWP during RACH process.

As illustrated, the UE may expect to receive a Msg2/RAR within an RAR window, defined by parameters N1 and N2. N1 refers to the minimum physical downlink shared channel (PDSCH) processing time and N2 refers to the minimum physical uplink shared channel (PUSCH) preparation time. In this example, an RAR is received and, thus, the UE is able to complete the RACH procedure (e.g., continuing to send the Msg3, receive and acknowledge a Msg4). After receiving an RRC configuration message, the UE may be switched from the initial BWP to an RRC based BWP (BWP 0).

FIG. 10 illustrates an example timeline 1000 for a RedCap UE. By contrast to the legacy UE RACH procedure of FIG. 9, after detecting an SSB in the non-RedCap BWP, the RedCap UE may perform its RACH procedure in the RedCap initial BWP that lacks SSBs. In the example shown in FIG. 10, however, despite the lack of SSB monitoring, the RedCap UE is able to successfully complete the RACH procedure and, after receiving an RRC configuration message, the UE may be switched from the RedCap initial BWP to an RRC based BWP (BWP 0).

Figure 11:
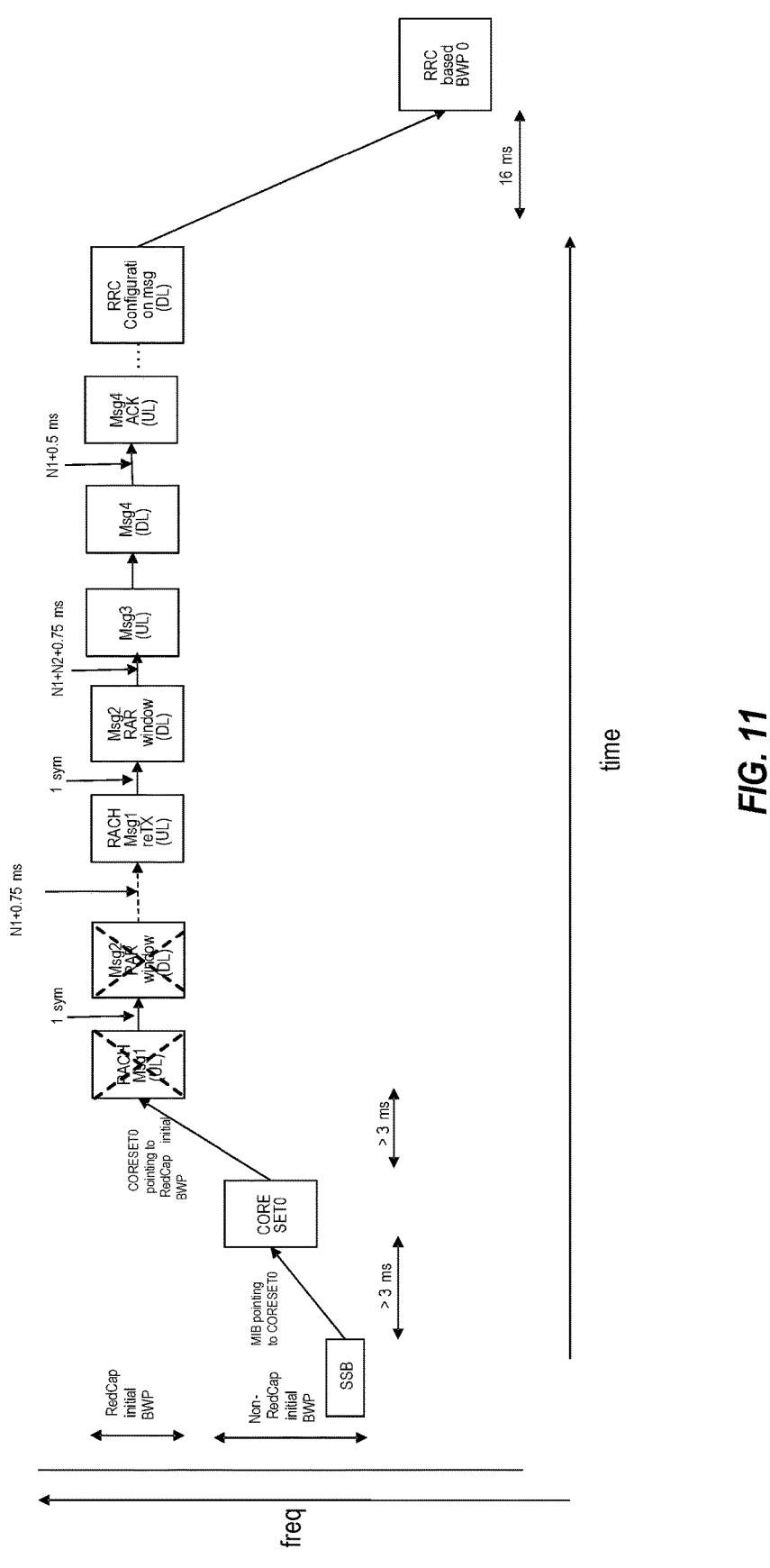
FIG. 11 depicts another example timeline for a RACH for a RedCap UE.

In the example timeline 1100 shown in FIG. 11, on the other hand, the RedCap UE is not able to successfully complete the RACH procedure, as Msg2 is not successfully received before the completion of the RAR window after sending the Msg1. In this case, with conventional RACH timelines, the RedCap UE will not get the opportunity to measure SSBs again before retransmitting Msg1. Unfortunately, the RedCap UE will have to re-select (RACH resources associated with) the same SSB during RACH retransmission. As noted above, the RedCap UE may face congestion in this particular SSB, which decreases the likelihood of RACH success after RACH retransmission.

According to certain aspects of the present disclosure, a UE may be able to extend certain timelines between a pair of RACH messages in order to switch to a BWP, during a RACH procedure, to a BWP that has SSBs. One example of an extended timeline is shown in the call flow diagram 1200 of FIG. 12.

As illustrated, the UE may first detect an SSB in a non-RedCap initial BWP. The UE may then switch to the RedCap initial BWP to perform the RACH procedure. After some number of MSG1 transmissions without receiving an RAR/MSG2, the UE switches back to the Non-RedCap initial BWP to monitor for SSBs.

After detecting an SSB, the UE may switch back to the RedCap Initial BWP to resume the RACH. As illustrated, upon return, the RACH procedure may now succeed. For example, upon return the UE may attempt the RACH based on a different SSB (with less congested RACH resources) than initially detected. While this example illustrated extending a timeline between an RAR window and MSG1 retransmission, a similar timeline may be extended between a MSG3 retransmission and expected MSG4 reception.

In other words, in some cases, the UE may retransmit (e.g., MSG1 or MSG3) multiple times without switching BWP. If those retransmissions do not succeed, a UE may switch BWP and measure multiple SSB periods for a longer time. In some cases, the network can define a timer and measurement gap period (e.g., through a standard specification or SIB signaling). If the UE does not successfully receive Msg2 or Msg4 within the timer duration, UE will be allowed to change BWP and measure SSBs during the measurement gap period.

Figure 12:
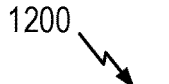
FIG. 12 depicts a call flow for RACH procedures with an extended timeline, in accordance with some aspects of the present disclosure.
Figure 13:
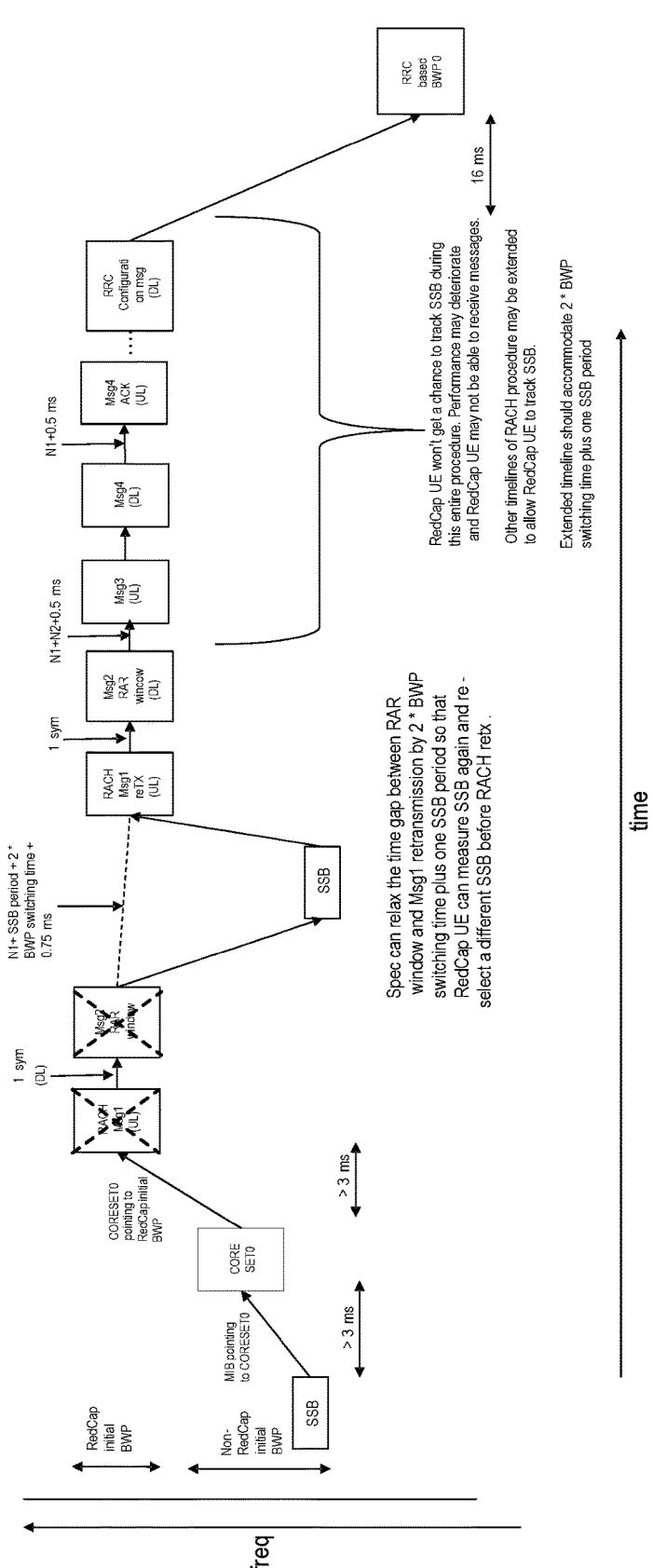
FIG. 13 depicts an example timeline for a RACH procedure for a RedCap UE with an extended timeline, in accordance with some aspects of the present disclosure.

An example of an extended timeline corresponding to the procedure is depicted in FIG. 12 and is illustrated in the example timeline 1300 of FIG. 13. As with the example timeline 1100 of FIG. 11, after initially detecting an SSB in the non-RedCap initial BWP, the UE attempts a RACH procedure in the RedCap initial BWP, but fails to receive a MSG2.

In this example, however, given the extended (relaxed) timeline, the UE is able to switch back to the Non-RedCap initial BWP to monitor for SSBs. As illustrated, the timeline between the end of the RAR window and MSG1 retransmission may be extended to account for BWP switching and SSP period (e.g., N1+SSB period+2*BWP switching_time+0.75 ms). After detecting an SSB in the Non-RedCap initial BWP, the UE may resume the RACH procedure on the RedCap BWP.

In this example, the MSG2 is successfully received. Even after successful receipt of the MSG2, the UE may still benefit from extended timelines to switch BWPs to monitor for an SSB. For example, as illustrated, even after receiving the MSG2, the RedCap UE may not get a chance to track SSBs for the remainder of the RACH procedure (from the MSG2 to the RRC configuration message). As a result, system performance may deteriorate and may not be able to receive subsequent messages.

To account for this potential issue, other timelines may be extended. For example, the timeline between MSG4 expected receipt and MSG3 retransmission or the timeline between an MSG4 Acknowledgment and an RRC configuration message. In such general, the extension between any pair of RACH messages may be sufficient to allow the RedCap UE to switch to a non-RedCap initial BWP to monitor measure SSBs and return to the previous BWP. For example, such timelines may be extended by 2*BWP switching_time plus one SSB period.

As illustrated in these examples, a UE may be able to extend the allowable time gap between the failed second RACH message (e.g., an RAR) and the first retransmitted RACH message (e.g., a MSG1). In some cases, the timeline may be sufficient to allow the UE to attempt a number n of MSG1 (re)transmissions, without receiving an RAR, before switching to another BWP to monitor for an SSB. The UE may transmit a first message, and monitor for the second message. In response, a UE transmits the first message a second time. This process may repeat for n number of times. In response, the UE may switch back to monitor SSBs in a first BWP. The value of n can be configured by network and may be equal to 1. In some cases, the network may define a timer and UE will decide the value of n based on timer duration, RACH locations and RAR window durations.

A UE may check the RACH configuration, the SSB-to-RO mapping pattern, the backoff period, and the time stamp of last SSB measurement to decide if it should switch BWP and measure SSBs. In some cases, a UE may stay in the first BWP for multiple SSB burst set periods before switching to a second BWP. The UE may retransmit multiple times without switching BWPs. This will allow UE to detect multiple samples and track SSBs properly. If those retransmissions do not succeed, UE may switch BWP and measure multiple SSB periods for a longer time.

Figure 14:
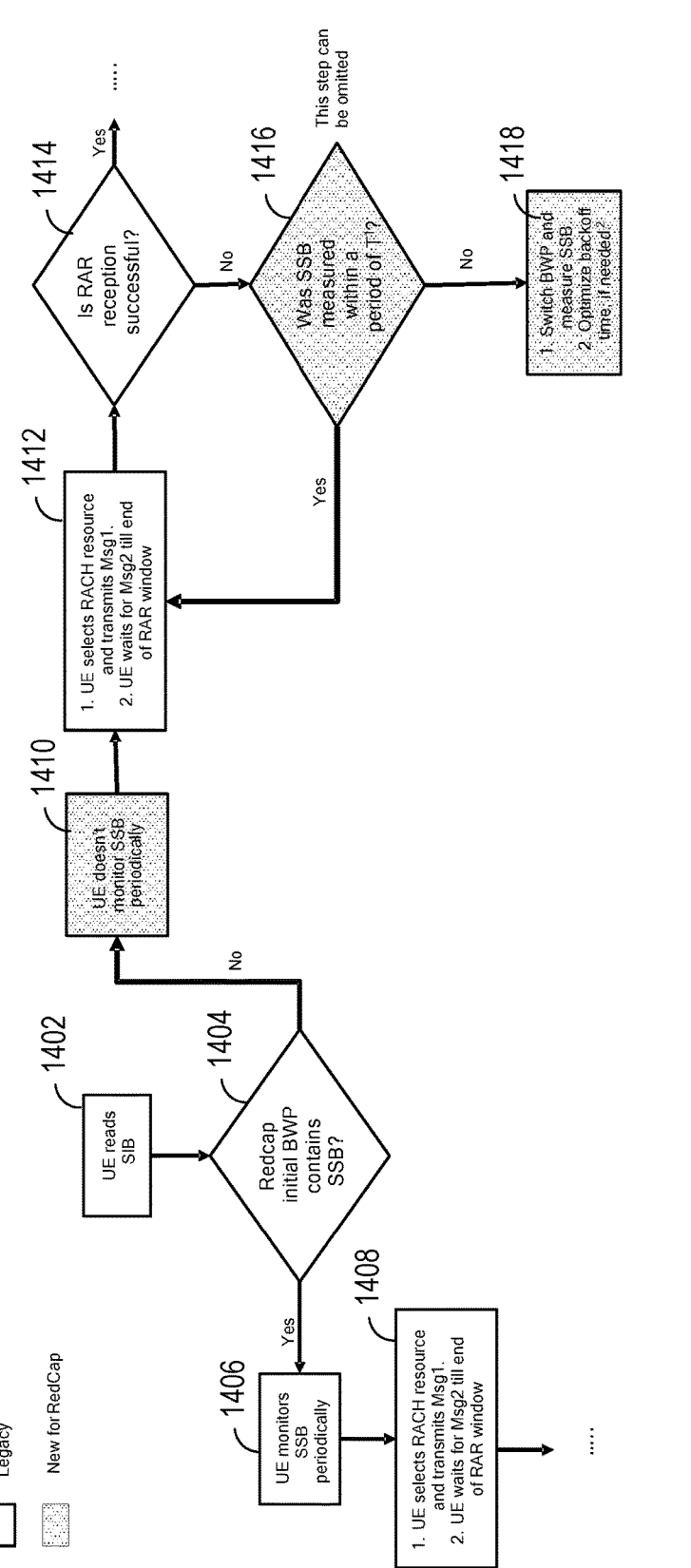
FIG. 14 depicts an example flow diagram for a RACH procedure, in accordance with some aspects of the present disclosure.

FIG. 14 is flow diagram illustrating behavior of a UE operating with an extended timeline, in accordance with aspects of the present disclosure. As illustrated, the UE may first read a SIB, at 1402. If, at 1404, the UE determines (from the SIB) that the RedCap initial BWP contains SSBs, the extended timelines may not be necessary. In other words, the UE may be able to monitor for SSBs periodically, at 1406, during a RACH procedure, began at 1408.

On the other hand, if the RedCap initial BWP does not contain SSBs, as indicated at 1410, the UE does not monitor SSBs periodically. In this case, at 1412, the UE selects a RACH resource and transmits MSG1, then waits for a MSG2 until the end of the RAR window. If the RAR reception is successful, as determined at 1414, the UE can proceed with the RACH procedure.

If the RAR reception is successful, as determined at 1414, the UE may determine if an SSB has been measured within a time period T (e.g., based on a time stamp when the last SSB measurement was taken). If so, the UE may consider its SSB measurement current and return to step 1412. If the SSB measurement is not current, the UE may proceed, at 1418, to switch BWPs to measure SSBs. In some cases, the UE may optimize its backoff time, for example, discarding a current pending backoff time if a new SSB is detected. The UE may then return to step 1412.

Figure 15:
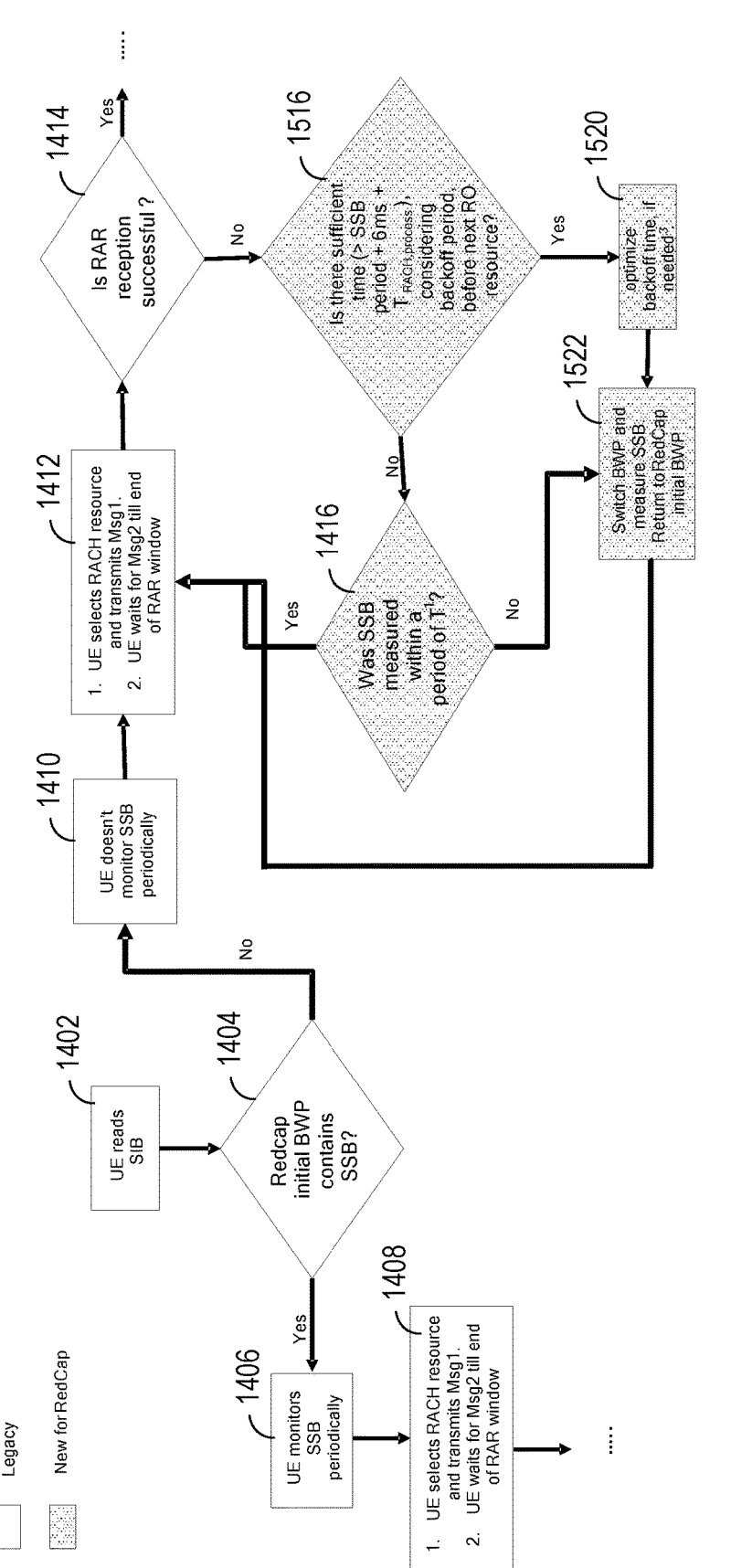
FIG. 15 depicts an example flow diagram for a RACH procedure, in accordance with some aspects of the present disclosure.

As illustrated in FIG. 15, in some cases, at 1516, the UE may first determine if it has sufficient time (e.g., >SSB period+6 ms+$T_{RACHprocess}$), considering a backoff period before a next RACH occasion (RO) resource. If not, the UE may proceed to 1416, to determine if an SSB has been measured within a time period T. If not, the UE may switch BWPs to measure SSBs, at 1522. If the SSB measurement is current, the UE may return to step 1412.

If the UE determines, at 1516, that it does have sufficient time before the next RO resource, the UE may optimize the backoff time, if needed, and switch BWPs to measure SSBs, at 1522, before returning to step 1412.

There are various options for how a UE may optimize a backoff time for a MSG1. In one example, a UE may indicate a backoff period of 100 ms. A UE may randomly select a value between 0 ms and 100 ms before MSG1 retransmission. In this scenario, a UE may check how much time it needs to switch to first BWP, measure SSBs, and switch back to second BWP. If this take 60 ms, in total, the UE may switch BWP and measure SSBs during the first 60 ms, then select a random backoff value between 60 to 100 ms for MSG1 retransmissions.

A network may define a timer and measurement gap period through specification or signal information block (SIB) signaling. For example, before the RedCap UE switches to its initial BWP for RACH (assuming no SSB is transmitted in the RedCap-specific initial DL BWP), the UE may keep a record of multiple SSB candidates and the associated PRACH resources. If the RedCap UE selects PRACH resources associated with beam A for RACH, but fails to receive MSG2 (or msgB) after N attempts of power ramping (or has reached P_{c, max} of an open loop power control (OLPC) parameter set, a RedCap UE may select the physical RACH (PRACH) resources associated with beam B to re-attempt RACH (without switching to the BWP with cell-defining SSB (CD-SSB) for additional SSB sampling). If the RedCap UE cannot complete RACH procedures after performing functions discussed above within a pre-configured timer (hard coded in specification, or indicated by SIB1), the RedCap UE may switch BWP and measure CD-SSB. This procedure can be applied when RedCap UE cannot decode MSG2 or MSG4.

If a UE cannot successfully receive MSG2 or MSG4 within the timer duration, the UE may be allowed to change BWP and measure SSBs during the measurement gap period. The timeline may be extended between different messages in the RedCap UE's RACH procedure so that the RedCap UE can switch BWP and measure SSBs. The extended time can be defined in a standard specification or configured by network. Extended time may indicate a measurement duration that will be initiated after the expiration of a timer.

The timer starts when the UE first transmits a PRACH message. The timer expires when UE cannot decode random access response or contention resolution within a certain period. The UE may switch BWP, measure SSBs, and come back to the BWP containing RACH search space during the measurement duration.

An extended timeline is needed when a RedCap UE is operating in a BWP without any SSB but within a RACH search space. The extended timeline between each pair of messages should allow the RedCap UE to go to the non-RedCap initial BWP, measure SSBs, and then come back to RedCap initial BWP. Extended timeline should be at least SSB period+2*BWP switching_time. The timeline is extended between different messages in RedCap UE's RACH procedure so that RedCap UE can switch BWP and measure SSBs.

The extended time may depend on a RedCap UE's capability. The RedCap UE may indicate capability in MSG1 (or msgA). A UE with two phase-locked loops (PLLs) or a single PLL may need different timing. Full duplex frequency domain duple (FDD) and half duplex FDD UEs may require different timing.

The extended timelines may be between any pair or combination of RACH messages, including MSG1 (PRACH) initial transmission, MSG1 retransmission, MSG2 (random access response), MSG3 (UL signal scheduled by random access response) initial transmission, MSG3 retransmissions, DCI command for MSG3 retransmissions, MSG4 (contention resolution message), MSG4 ACK, and subsequent messages. The pair or combination of RACH messages may also include 2-step RACH messages (e.g., MsgA and MsgB). Type 1 or type 2 UEs (as defined in legacy Rel-15 BWP switching) may need different times. The duration of extended timelines may also depend on the SCS of different messages or frequency range.

According to certain aspects of the present disclosure, during the RACH procedure, at the end of time of a first-time instance, a UE may switch BWP, measure SSBs, and then return to the BWP containing RACH search space. A UE may decide to switch BWP based on the backoff period, location of RACH resources, SSB to RACH mapping, BWP switching time, SSB processing time and time stamp of last SSB measurement. A first time instance may refer to one or more combination of the end of RAR window, end of contention resolution window or a timer. The timer might be defined in the specification or configured by the network.

Example Methods

Figure 16:
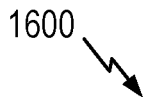
FIG. 16 illustrates example operations for wireless communications by a network entity, in accordance with some aspects of the present disclosure.

FIG. 16 illustrates example operations 1600 for wireless communication by a network entity. The operations 1600 may be performed, for example, by a base station (e.g., BS 102 of FIG. 1) to switch from a second bandwidth (BWP) to a first BWP to monitor for synchronization signal blocks (SSBs) during a random access channel (RACH) procedure.

At 1610, a network entity may determine one or more parameters to allow a user equipment (UE) to switch, during a RACH procedure, from a second BWP to a first BWP to monitor for SSBs.

At 1620, a network entity may transmit signaling, to the UE, configuring the UE with the one or more parameters.

FIG. 17 illustrates example operations 1700 for wireless communication by a UE. The operations 1700 may be performed, for example, by a UE (e.g., such as a UE 104 of FIG. 1) to switch from a second BWP to a first BWP to monitor for SSBs during a RACH procedure.

At 1710, a UE may detect at least a first SSB transmitted in a first bandwidth part (BWP).

At 1720, a UE may transmit, in a second BWP, a number of first messages as part of a RACH procedure.

At 1730, a UE may monitor, in the second BWP, for a second message sent in response to the number of first messages.

At 1740, a UE may switch back to the first BWP to monitor for SSBs, if the second message is not received within a first timeline after transmitting the number of first messages and one or more conditions are met. For example, the first timeline may correspond to any time after an RAR window in which the UE expects a Msg2 (but fails to receive one) and a retransmission time for Msg1. The UE may switch back to the first BWP with sufficient time to monitor for SSBs (for an SSB period) and return by the retransmission time (e.g., this may all occur the extended time shown in FIG. 12).

Example Wireless Communication Devices

FIG. 18 depicts an example communications device 1800 that includes various components operable, configured, or adapted to perform operations for the techniques disclosed herein, such as the operations depicted and described with respect to FIG. 16. In some examples, communication device 1800 may be a base station 102 as described, for example with respect to FIGS. 1 and 2.

Communications device 1800 includes a processing system 1802 coupled to a transceiver 1808 (e.g., a transmitter and/or a receiver). Transceiver 1808 is configured to transmit (or send) and receive signals for the communications device 1800 via an antenna 1810, such as the various signals as described herein. Processing system 1802 may be configured to perform processing functions for communications device 1800, including processing signals received and/or to be transmitted by communications device 1800.

Processing system 1802 includes one or more processors 1820 coupled to a computer-readable medium/memory 1830 via a bus 1806. In certain aspects, computer-readable medium/memory 1830 is configured to store instructions (e.g., computer-executable code) that when executed by the one or more processors 1820, cause the one or more processors 1820 to perform the operations illustrated in FIG. 16, or other operations for performing the various techniques discussed herein for supporting wireless communication on multiple BWPs.

In the depicted example, computer-readable medium/memory 1830 stores code 1831 for determining one or more parameters to allow a user equipment (UE) to switch, during a random access channel (RACH) procedure, from a second BWP to a first BWP to monitor for synchronization signal blocks (SSBs), and code 1832 for transmitting signaling, to the UE, configuring the UE with the one or more parameters.

In the depicted example, the one or more processors 1820 include circuitry configured to implement the code stored in the computer-readable medium/memory 1830, including circuitry 1821 for determining one or more parameters to allow a UE to switch, during a RACH procedure, from a second BWP to a first BWP to monitor for SSBs and circuitry 1822 for transmitting signaling, to the UE, configuring the UE with the one or more parameters.

Various components of communications device 1800 may provide means for performing the methods described herein, including with respect to FIG. 16.

In some examples, means for transmitting or sending (or means for outputting for transmission) may include the transceivers 232 and/or antenna(s) 234 of the base station 102 illustrated in FIG. 2 and/or transceiver 1808 and antenna 1810 of the communication device 00 in FIG. 18.

In some examples, means for receiving (or means for obtaining) may include the transceivers 232 and/or antenna(s) 234 of the base station illustrated in FIG. 2 and/or transceiver 1808 and antenna 1810 of the communication device 1800 in FIG. 18.

In some examples, means for determining and/or transmitting may include various processing system components, such as: the one or more processors 20 in FIG. 18, or aspects of the base station 102 depicted in FIG. 2, including receive processor 238, transmit processor 220, TX MIMO processor 230, and/or controller/processor 240 (including BWP manager component 241).

Notably, FIG. 18 is an example, and many other examples and configurations of communication device 1800 are possible.

Figure 19:
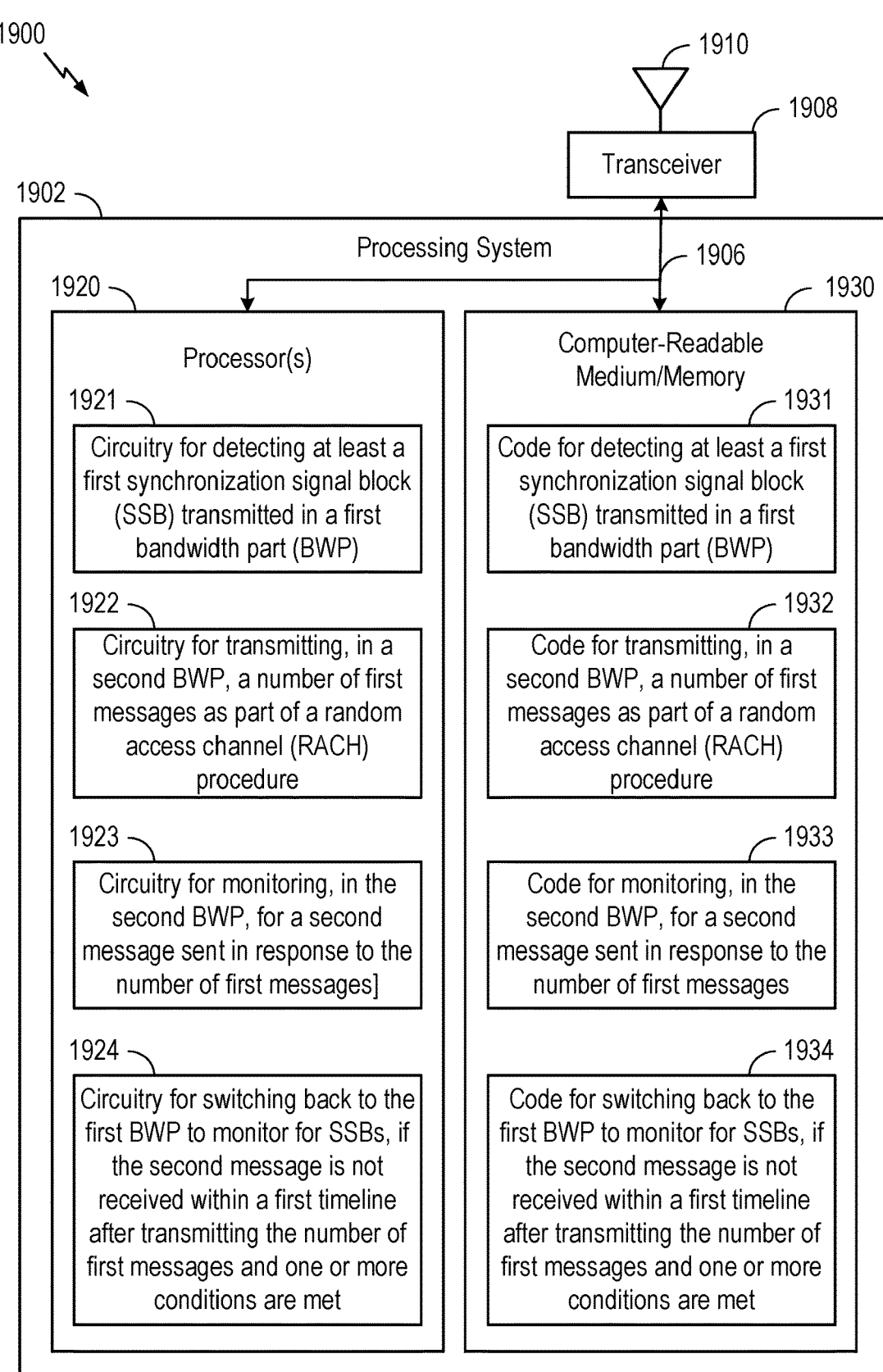
FIG. 19 depicts aspects of an example communications device.

FIG. 19 depicts an example communications device 1900 that includes various components operable, configured, or adapted to perform operations for the techniques disclosed herein, such as the operations depicted and described with respect to FIG. 17. In some examples, communication device 1900 may be a user equipment 104 as described, for example with respect to FIGS. 1 and 2.

Communications device 1900 includes a processing system 1902 coupled to a transceiver 1908 (e.g., a transmitter and/or a receiver). Transceiver 1908 is configured to transmit (or send) and receive signals for the communications device 1900 via an antenna 1910, such as the various signals as described herein. Processing system 1902 may be configured to perform processing functions for communications device 1900, including processing signals received and/or to be transmitted by communications device 1900.

Processing system 1902 includes one or more processors 1920 coupled to a computer-readable medium/memory 1930 via a bus 1906. In certain aspects, computer-readable medium/memory 1930 is configured to store instructions (e.g., computer-executable code) that when executed by the one or more processors 1920, cause the one or more processors 1920 to perform the operations illustrated in FIG. 17, or other operations for performing the various techniques discussed herein for switch BWPs based on detected SSBs.

In the depicted example, computer-readable medium/memory 1930 stores code 1931 for detecting at least a first SSB transmitted in a first BWP, code 1932 for transmitting, in a second BWP, a number of first messages as part of a RACH procedure, code 1933 for monitoring, in the second BWP, for a second message sent in response to the number of first messages, and code 1934 for switching back to the first BWP to monitor for SSBs, if the second message is not received within a first timeline after transmitting the number of first messages and one or more conditions are met code.

In the depicted example, the one or more processors 1920 include circuitry configured to implement the code stored in the computer-readable medium/memory 1930, including circuitry 1921 for detecting at least a first SSB transmitted in a first BWP, circuitry 1922 for transmitting, in a second BWP, a number of first messages as part of a RACH procedure, circuitry 1923 for monitoring, in the second BWP, for a second message sent in response to the number of first messages, and circuitry 1924 for switching back to the first BWP to monitor for SSBs, if the second message is not received within a first timeline after transmitting the number of first messages and one or more conditions are met.

Various components of communications device 1900 may provide means for performing the methods described herein, including with respect to FIG. 17.

In some examples, means for transmitting or sending (or means for outputting for transmission) may include the transceivers 254 and/or antenna(s) 252 of the user equipment 104 illustrated in FIG. 2 and/or transceiver 1908 and antenna 1910 of the communication device 1900 in FIG. 19.

In some examples, means for receiving (or means for obtaining) may include the transceivers 254 and/or antenna(s) 252 of the user equipment 104 illustrated in FIG. 2 and/or transceiver 1908 and antenna 1910 of the communication device 1900 in FIG. 19.

In some examples, means for detecting, transmitting, monitoring, and/or switching may include various processing system components, such as: the one or more processors 1920 in FIG. 19, or aspects of the user equipment 104 depicted in FIG. 2, including receive processor 258, transmit processor 264, TX MIMO processor 266, and/or controller/processor 280 (including BWP manager component 281).

Notably, FIG. 19 is an example, and many other examples and configurations of communication device 1900 are possible.

Example Clauses

Implementation examples are described in the following numbered clauses:

Clause 1: A method for wireless communication by a network entity, comprising determining one or more parameters to allow a user equipment (UE) to switch, during a random access channel (RACH) procedure, from a second BWP to a first BWP to monitor for synchronization signal blocks (SSBs), and transmitting signaling, to the UE, configuring the UE with the one or more parameters.

Clause 2: The method of clause 1, wherein the one or more parameters configure the UE to switch from the second BWP to the first BWP after transmitting a number of first messages in the first BWP if the UE does not receive a second message sent in response to the number of first messages within a first timeline.

Clause 3: The method of clause 2, wherein the one or more parameters include the number of first messages that it can transmit before switching to the first BWP.

Clause 4: The method of any one of clauses 2 through 3, where one or more parameters configure the UE with a timer.

Clause 5: The method of any one of clauses 2 through 4, wherein the one or more parameters configure the UE with an extended timeline in which the UE switches back to the first BWP to monitor for SSBs after transmitting the first message.

Clause 6: The method of clause 5, wherein the extended timeline depends on a capability of the UE.

Clause 7: The method of clause 6, further comprising receiving an indication of the capability from the UE in one of the number of first messages.

Clause 8: A method for wireless communication by a user equipment (UE), comprising detecting at least a first synchronization signal block (SSB) transmitted in a first bandwidth part (BWP), transmitting, in a second BWP, a number of first messages as part of a random access channel (RACH) procedure, monitoring, in the second BWP, for a second message sent in response to the number of first messages, and switching back to the first BWP to monitor for SSBs, if the second message is not received within a first timeline after transmitting the number of first messages and one or more conditions are met.

Clause 9: The method of clause 8, wherein the UE monitors for a second message during the time that lies between transmission of two first messages.

Clause 10: The method of any one of clauses 8 through 9, wherein the UE transmits the first message and monitors for the second message only one time before switching back to the first BWP.

Clause 11: The method of any one of clauses 8 through 10, wherein the UE is configured by network regarding the number of first messages that it can transmit before switching to the first BWP.

Clause 12: The method of any one of clauses 8 through 11, wherein the UE is configured a timer.

Clause 13: The method of clause 12, wherein the UE decides the number of first messages that it should transmit before switching based on the combination of timer duration, location of RACH resources and duration of random access response.

Clause 14: The method of any one of clauses 8 through 13, wherein the first message comprises a RACH preamble transmitted in a RACH occasion associated with the first SSB, and the second message comprises a random access response (RAR).

Clause 15: The method of any one of clauses 8 through 14, wherein the first message comprises UL signal scheduled by a random access response (RAR), and the second message comprises a contention resolution message.

Clause 16: The method of any one of clauses 8 through 15, wherein at least one of the conditions involves expiration of a timer.

Clause 17: The method of any one of clauses 14 through 16, wherein at least one of the conditions comprises the UE retransmitting the first message one or more times without receiving the second message within an expected time.

Clause 18: The method of any one of clauses 8 through 17, wherein the UE switches back to the first BWP to monitor for SSBs within an extended timeline after transmitting the first message.

Clause 19: The method of clause 18, further comprising receiving signaling indicating the extended timeline.

Clause 20: The method of any one of clauses 18 through 19, wherein the extended timeline includes a measurement duration initiated after expiration of a timer after transmitting the first message.

Clause 21: The method of any one of clauses 18 through 20, further comprising, within the extended timeline: one or more samples of a second SSB in the first BWP, switching back to the second BWP, and retransmitting, in the second BWP, the first message using resources associated with the second SSB.

Clause 22: The method of any one of clauses 18 through 21, further comprising, within the extended timeline: receiving a paging message in the first BWP before switching back to the second BWP.

Clause 23: The method of any one of clauses 18 through 22, wherein the extended timeline depends on a capability of the UE.

Clause 24: The method of clause 23, further comprising providing an indication of the capability of the UE in the first message.

Clause 25: The method of any one of clauses 18 through 24, wherein the extended timeline is defined between different messages, the different messages comprising at least two of: an initial transmission of a RACH preamble, a retransmission of the RACH preamble, a random access response (RAR), an uplink signal scheduled by a (RAR) initial transmission, a retransmission of the uplink signal scheduled by the RAR, a downlink control information (DCI) for DCI command for the retransmission of the uplink signal scheduled by the RAR, a contention resolution message, or an acknowledgment of the contention resolution message.

Clause 26: The method of clause 25, wherein the extended timeline depends on at least one of: a subcarrier spacing (SCS) of the different messages or a frequency range.

Clause 27: The method of any one of clauses 25 through 26, wherein the extended timeline applies when the second BWP lacks SSB transmissions.

Clause 28: The method of any one of clauses 8 through 27, further comprising, during the RACH procedure: detecting a second SSB in the first BWP, switching back to the second BWP, and retransmitting, in the second BWP, the first message using resources associated with the second SSB.

Clause 29: The method of clause 28, wherein the first timeline comprises at least one of: an end of a random access response (RAR) window, or a contention resolution window or a timer.

Clause 30: The method of any one of clauses 28 through 29, wherein the UE decides when to switch back to the first BWP or switch back to the second BWP based on at least one of: a backoff period, a location of RACH resources, an SSB to RACH resource mapping, BWP switching time, SSB processing time, or a time stamp of a last SSB measurement.

Clause 31: The method of clause 30, wherein the UE updates its backoff period for Msg1 retransmission if it switches BWP and measures SSB.

Clause 32: The method of clause 31, wherein the UE updates its backoff period based on the combination of original backoff period, and a required time to switch BWP and measure SSBs.

Clause 33: The method of any one of clauses 8 through 32, wherein detecting at least a first SSB comprises detecting at least first and second SSBs, and the UE switches back to the first BWP only after failing to receive a second message after transmitting a first message based on resources associated with the first and second SSBs.

Clause 34: An apparatus, comprising: a memory comprising executable instructions; one or more processors configured to execute the executable instructions and cause the apparatus to perform a method in accordance with any one of Clauses 1-33.

Clause 35: An apparatus, comprising means for performing a method in accordance with any one of Clauses 1-33.

Clause 36: A non-transitory computer-readable medium comprising executable instructions that, when executed by one or more processors of an apparatus, cause the apparatus to perform a method in accordance with any one of Clauses 1-33.

Clause 37: A computer program product embodied on a computer-readable storage medium comprising code for performing a method in accordance with any one of Clauses 1-33.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mm-Wave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of switching from a reduced capability (RedCap) bandwidth part (BWP) to a non-RedCap BWP to receive synchronization signal blocks (SSBs) during a random access channel (RACH) procedure in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
at least one memory comprising executable instructions; and
one or more processors configured to execute the executable instructions to cause the UE to:
detect at least a first synchronization signal block (SSB) in a first bandwidth part (BWP);
switch to a second BWP in response to detection of the first SSB in the first BWP;
perform a random access channel (RACH) procedure in the second BWP, wherein, in order to perform the RACH procedure, the one or more processors are configured to cause the UE to:
transmit one or more first messages in the second BWP;
monitor, in the second BWP, for a second message that is responsive to the one or more first messages;
switch back to the first BWP, during the RACH procedure, to monitor for additional SSBs in the first BWP when the second message is not received within a first timeline after transmission of the one or more first messages and when one or more conditions are met.

2. The UE of claim 1, wherein the one or more processors are configured to cause the UE to monitor for the second message during a time that lies between transmission of two first messages.

3. The UE of claim 1, wherein one or more processors are configured to cause the UE to transmit the one or more first messages and monitor for the second message only one time before switching back to the first BWP.

4. The UE of claim 1, wherein the UE is configured by a network entity with a quantity of the one or more first messages to transmit before the switch back to the first BWP.

5. The UE of claim 1, wherein:
the UE is configured with a timer; and
the one or more processors are configured to cause the UE to decide a quantity of the one or more first messages that the UE should transmit before switching back to the first BWP based on a combination of timer duration, a location of RACH resources, and a duration of random access response.

6. The UE of claim 1, wherein:
the one or more first messages comprise a RACH preamble transmitted in a RACH occasion associated with the first SSB; and
the second message comprises a random access response (RAR).

7. The UE of claim 1, wherein:
the one or more first messages comprise an UL signal scheduled by a random access response (RAR); and
the second message comprises a contention resolution message.

8. The UE of claim 1, wherein at least one of the conditions involves expiration of a timer.

9. The UE of claim 6, wherein at least one of the conditions comprises the UE retransmitting the one or more first messages a quantity of times without receiving the second message within the first timeline.

10. The UE of claim 1, wherein the one or more processors are configured to cause the UE to switch back to the first BWP to monitor for the additional SSBs within an extended timeline after transmitting the one or more first messages.

11. The UE of claim 10, wherein the one or more processors are further configured to cause the UE to receive signaling indicating the extended timeline.

12. The UE of claim 10, wherein the extended timeline includes a measurement duration initiated after expiration of a timer after transmitting the one or more first messages.

13. The UE of claim 10, wherein the one or more processors are further configured to cause the UE to, within the extended timeline:
detect a second SSB in the first BWP based on the monitoring after switching back to the first BWP;
switch back to the second BWP; and
retransmit, in the second BWP, at least one first message of the number of first messages using resources associated with the second SSB.

14. The UE of claim 10, wherein the one or more processors are further configured to cause the UE to, within the extended timeline receive a paging message in the first BWP before switching back to the second BWP.

15. The UE of claim 10, wherein the extended timeline depends on a capability of the UE.

16. The UE of claim 15, wherein the one or more processors are further configured to cause the UE to provide an indication of the capability of the UE in the one or more first messages.

17. The UE of claim 10, wherein the extended timeline is defined between different messages, the different messages comprising at least two of:
an initial transmission of a RACH preamble, a retransmission of the RACH preamble, a random access response (RAR), an uplink signal scheduled by a (RAR) initial transmission, a retransmission of the uplink signal scheduled by the RAR, a downlink control information (DCI) for DCI command for the retransmission of the uplink signal scheduled by the RAR, a contention resolution message, or an acknowledgment of the contention resolution message.

18. The UE of claim 17, wherein the extended timeline depends on at least one of: a subcarrier spacing (SCS) of the different messages or a frequency range.

19. The UE of claim 17, wherein the extended timeline applies when the second BWP lacks SSB transmissions.

20. The UE of claim 19, wherein the first timeline comprises at least one of:
a random access response (RAR) window; or
a contention resolution window or a timer.

21. The UE of claim 19, wherein the one or more processors are configured to cause the UE to decide when to switch back to the first BWP or switch back to the second BWP based on at least one of: the backoff period, a location of RACH resources, an SSB to RACH resource mapping, BWP switching time, SSB processing time, or a time stamp of a last SSB measurement.

22. The UE of claim 21, wherein the one or more processors are configured to cause the UE to update a backoff period for retransmission of the one or more first messages based on a combination of an original backoff period and a required time to, at least, switch back to the first BWP and monitor for the additional the SSBs.

23. The UE of claim 1, wherein:
to detect at least the first SSB, the one or more processors are configured to cause the UE to detect at least first and second SSBs; and
the one or more processors are configured to cause the UE to switch back to the first BWP only after failing to receive the second message after transmitting the one or more first messages based on resources associated with the first and second SSBs.

24. A network entity, comprising:
at least one memory comprising executable instructions; and
one or more processors configured to execute the executable instructions to cause the network entity to:
determine one or more parameters that cause a user equipment (UE) to switch, during a random access channel (RACH) procedure, from a second bandwidth part (BWP) to a first BWP to monitor for synchronization signal blocks (SSBs), wherein the one or more parameters cause the UE to switch from the second BWP to the first BWP in response to transmitting one or more first messages in the second BWP and not receiving a second message sent in response to the one or more first messages within a first timeline; and
transmit signaling, to the UE, configuring the UE with the one or more parameters.

25. The network entity of claim 24, wherein the one or more parameters include a quantity of the one or more first messages to transmit before switching to the first BWP.

26. The network entity of claim 24, where one or more parameters include a timer for deciding when to switch from the second BWP to the first BWP during the RACH procedure.

27. A method for wireless communications by a user equipment (UE), comprising:
detecting at least a first synchronization signal block (SSB) transmitted in a first bandwidth part (BWP);
switching to a second BWP in response to detection of the first SSB in the first BWP;
performing a random access channel (RACH) procedure in the second BWP, wherein performing the RACH procedure comprises:
transmitting one or more first messages in the second BWP;
monitoring, in the second BWP, for a second message sent in response to the one or more first messages; and
switching back to the first BWP, during the RACH procedure, to monitor for additional SSBs in the first BWP when the second message is not received within a first timeline after transmitting the one or more first messages and when one or more conditions are met.

28. A method for wireless communications by a network entity, comprising:
determining one or more parameters to allow that cause a user equipment (UE) to switch, during a random access channel (RACH) procedure, from a second bandwidth part (BWP) to a first BWP to monitor for synchronization signal blocks (SSBs), wherein the one or more parameters cause the UE to switch from the second BWP to the first BWP in response to transmitting one or more first messages in the second BWP and not receiving a second message sent in response to the one or more first messages within a first timeline; and
transmitting signaling, to the UE, configuring the UE with the one or more parameters.

* * * * *